United States Patent
Ko et al.

(10) Patent No.: US 7,218,683 B2
(45) Date of Patent: May 15, 2007

(54) CHANNEL ENCODING/DECODING METHOD AND MULTIPLE-ANTENNA COMMUNICATION TRANSMITTING/RECEIVING SYSTEM PERFORMING THE SAME

(75) Inventors: Young Jo Ko, Daejon-Shi (KR); Jung Im Kim, Daejon-Shi (KR)

(73) Assignee: Electronics and Telecommunications Research Institute, Daejon-Shi (KR)

( * ) Notice: Subject to any disclaimer, the term of this patent is extended or adjusted under 35 U.S.C. 154(b) by 757 days.

(21) Appl. No.: 10/325,861

(22) Filed: Dec. 23, 2002

(65) Prior Publication Data

US 2004/0071223 A1   Apr. 15, 2004

(30) Foreign Application Priority Data

Oct. 15, 2002   (KR) .................. 10-2002-0062749

(51) Int. Cl.
  *H04B 7/02*   (2006.01)
(52) U.S. Cl. .................. 375/299; 375/267; 375/347
(58) Field of Classification Search ............. 375/299, 375/267, 298, 347
  See application file for complete search history.

(56) References Cited

U.S. PATENT DOCUMENTS

| 6,115,427 A | 9/2000 | Calderbank et al. |
| 6,769,093 B1 * | 7/2004 | Krieger ............... 714/814 |
| 2002/0034261 A1 * | 3/2002 | Eidson et al. ........... 375/298 |
| 2002/0168017 A1 * | 11/2002 | Berthet et al. .......... 375/267 |
| 2003/0021355 A1 * | 1/2003 | You .................... 375/267 |
| 2003/0072285 A1 * | 4/2003 | Onggosanusi et al. ...... 370/335 |

FOREIGN PATENT DOCUMENTS

| JP | 181968 A * | 7/1997 |
| WO | 01/26257 | 4/2001 |

OTHER PUBLICATIONS

Lin et al. Improved space-time codes using serial concatenation, Communications Letters, IEEE, vol. 4, Issue 7, Jul. 2000 pp. 221-223.*

Xiaotong Lin, et al. : *Improved Space-Time Codes Using Serial Concatenation; IEEE Communications Letters*; vol. 4, No. 7; Jul. 2000; pp. 221-223.

Eun Jeong Yim, et al.; *MIMO iterative decoding of serial concatenation using space-time trellis codes; Electronics Letters*; vol. 38, No. 4; Feb. 14, 2002; pp. 190-191.

* cited by examiner

*Primary Examiner*—Mohammed Ghayour
*Assistant Examiner*—Leila Malek
(74) *Attorney, Agent, or Firm*—Lowe Hauptman & Berner LLP

(57) ABSTRACT

A channel encoding/decoding method and a multiple-antenna wireless communication transmitting/receiving system performing the same are disclosed. A transmitter of the multiple-antenna wireless communication system comprises a space-time encoder, interleavers, a P/S converter, a RSC encoder, a S/P converter, and a modulator. A receiver of the multiple-antenna wireless communication system comprises a RSC decoder, deinterleavers, a space-time decoder, and interleavers. The frame error rates from the information transmission and reception by the present invention are found to be significantly lower than those by the multiple encoding/separated decoding method. Compared with the multiple encoding/joint decoding method, the present invention maintains comparable or better performance, while simplifying the decoding procedure considerably thereby it reduces the complexity in the hardware implementation.

7 Claims, 2 Drawing Sheets

CHANNEL ENCODING/DECODING METHOD AND MULTIPLE-ANTENNA COMMUNICATION TRANSMITTING/RECEIVING SYSTEM PERFORMING THE SAME

BACKGROUND OF THE INVENTION

1. Field of the Invention

The present invention relates to a channel encoding/decoding method in wireless communication systems, more particularly, to a serial concatenation of space-time codes applicable to communication systems with multiple antennas.

2. Description of the Prior Art

The serial-concatenation of space-time codes uses a space-time code as the outer code and uses a recursive systematic convolutional (RSC) code as the inner code. For wireless communication systems using several transmission and reception antennas at the transmitter and receiver, respectively, a method of corresponding a recursive systematic convolutional code to the respective transmit antenna as the inner code was proposed. This method was designed to increase the coding gain of the overall space-time code, and decoding is performed separately for the respective RSC code at the receiver. In the paper entitled "Improved space-time codes using serial concatenation" in "IEEE Communications Letters", June, 2000, the same number of RSC codes as that of the transmission antennas are used as the inner code, and the decoding for the inner code is performed separately for the individual codes by using an inner decoder corresponding to the respective RSC code. In the case of using the multiple codes as the inner code and decoding them individually, each decoder for decoding the inner code has $2^{nq}$ trellis branches per state and the total number of the trellis branches that must be computed so as to perform the decoding for Nnq bits in one iteration becomes (the state number)$\times N \times 2^{nq}$. Although such individual decoding method has a simple decoding procedure and low complexity, it has low decoding efficiency, that is, low performance.

On the other hand, a relatively complex decoding method has the same encoding procedure as that of the above-mentioned method, but a combined decoding is performed for all the RSC codes. In the paper entitled "MIMO iterative decoding of serial concatenation using space-time trellis codes" in "Electronics Letters", February, 2002, the same number of RSC codes as that of the transmit antennas are used as the inner code, and the decoding is performed by combining the RSC codes into a single code and decoding the combined code. In the case of using the multiple codes as the inner code and jointly decoding the combined code, the total number of trellis states for the combined code increases to (the state number of a single encoder)$^N$, and each trellis state has $2^{Nnq}$ trellis branches, thereby the total number of the branches that must be computed so as to perform the decoding of Nnq bits in one iteration becomes (the state number)$^N \times 2^{Nnq}$. This joint decoding method is highly efficient, but has a severe disadvantage in terms of hardware implementation because the complexity thereof increases exponentially with increasing the number of transmit antennas N.

SUMMARY OF THE INVENTION

Thus, the object of the present invention is to provide a channel encoding/decoding method capable of reducing the complexity of the joint decoding method, maintaining the performance of the complex joint decoding method.

In addition, the other object of the present invention is to provide a multiple-antenna wireless communication system capable of reducing the complexity of the joint decoding method, maintaining the performance of the complex joint decoding method.

In order to solve the above-mentioned problems, a multiple-antenna wireless communication transmitting system having a plurality of transmit antennas, comprises a space-time encoder for receiving information bits and outputting a plurality of the code symbols per input symbol, interleavers for interleaving the plurality of the code symbols outputted from said space-time encoder, a P/S converter for converting the plurality of the parallel symbols outputted from said interleavers into serial symbols, a RSC encoder for encoding the serial symbols outputted from said P/S converter and outputting the code symbols, a S/P converter for converting the serial code symbols outputted from said RSC encoder into a plurality of the parallel symbols and a modulator for modulating the plurality of the parallel symbols outputted from said S/P converter and outputting the modulated signals to a plurality of the transmit antennas, each transmitting antenna corresponding to the respective modulated signal.

In order to solve the above-mentioned problems, a multiple-antenna wireless communication receiving system having a plurality of receiving antennas comprises a RSC decoder for computing the a posteriori probability distribution by using the signals received through the receiving antennas and the a priori probability for the input symbols of the RSC code outputted from interleavers, and extracting and outputting extrinsic informations from the computed probability distribution, deinterleavers for deinterleaving the plurality of the extrinsic informations outputted from said RSC decoder, a space-time decoder for computing the a posteriori probability distribution for the output of the space-time code by using the a priori probability distributions outputted from said deinterleavers, and extracting and outputting extrinsic information from the computed probability distribution, interleavers for interleaving the plurality of the extrinsic informations outputted from said space-time decoder and outputting the interleaved signals to said RSC decoder, wherein after the feedback loop from said space-time decoder to said RSC decoder is iterated by a predetermined number, the probability distribution for the input bits of the outer code is computed to determine the values of the information bits in said space-time decoder.

In order to solve the above-mentioned problems, a channel encoding method performed in a multiple-antenna wireless communication transmitting system comprises the steps of space-time encoding input information bits, interleaving a plurality of the space-time encoded symbols, converting said interleaved parallel symbols into serial symbols, RSC encoding said serial symbols to RSC encoded symbols, converting said RSC encoded symbols into a plurality of the parallel symbols and after the plurality of the parallel symbols are modulated, transmitting the modulated signals through a plurality of the transmitting antennas each transmitting antenna corresponding to the respective modulated signal.

In order to solve the above-mentioned problems, a channel decoding method performed in a multiple-antenna wireless communication receiving system comprises the steps of (a) RSC decoding to compute the a posteriori probability distribution for the input symbols of the RSC code by using signals received through a plurality of the receiving antennas, (b) deinterleaving said RSC decoded extrinsic informations, (c) performing space-time decoding by computing the a posteriori probability distribution for the output symbols of the space-time code by using the deinterleaved extrinsic informations as the a priori probability distribution for the output symbols of the space-time code, (d) interleaving the space-time decoded extrinsic informations, (e) RSC decoding to compute the a posteriori probability distribution for the input symbols of the RSC code by using said interleaved symbols as the a priori probability for the input symbols of the RSC code and by using the signals received through said plurality of the receiving antennas, (f) performing steps of (b) to (c), and (g) determining the values of the information bits by computing the probability distribution for the input symbols of the space-time code.

DESCRIPTION OF THE PREFERRED EMBODIMENT

Hereinafter, the embodiments of the present invention will be explained with reference to the accompanying drawings. However, these embodiments are provided so that those skilled in the art can understand the present invention and it may be variously changed, and the present invention should not be understood as limited to the specific embodiments thereof.

Figure 1:
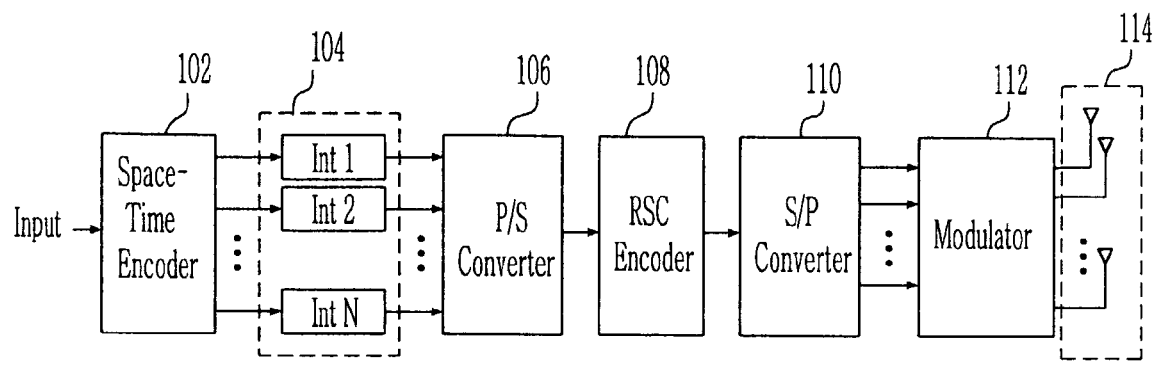
FIG. 1 is a block diagram illustrating the encoding method of a transmitter having multiple antennas according to the embodiment of the present invention.

FIG. 1 is a block diagram illustrating the encoding method of the transmitter having multiple antennas according to the embodiment of the present invention and the transmitter of the wireless communication system comprises a space-time encoder 102, interleavers 104, a P/S converter 106, a RSC encoder 108, a S/P converter 110, a modulator 112, and transmitting antennas 114.

Referring to FIG. 1, the space-time encoder 102 receives information bits as an input symbol and outputs N code symbols per one input symbol in the form of bit streams. The interleavers 104 are composed of Int1 to IntN, and interleave the N code symbols outputted from the space-time encoder 102. The bit stream outputs from the interleavers 104 are aligned in the stream by the P/S converter 106. In other words, the P/S converter 106 receives the N parallel outputs outputted from the interleavers 104 and converts them into serial outputs in the order of Int1, Int2, . . . IntN. The aligned streams are inputted to the RSC encoder 108 and the RSC encoder 108 encodes the serial bits to new output code bits. The outputs of the RSC encoder 108 are converted into N bit streams by the S/P converter 110. Each bit stream is individually modulated in the modulator 112 and is transmitted through the transmitting antenna 114.

The above-mentioned P/S conversion and S/P conversion are performed by the next converting procedure in order to obtain high coding gain of overall the space-time code. If the N code symbols outputted from the space-time encoder at each time are $C^1, C^2, \ldots, C^N$ and the transmitting antennas 114 corresponding thereto are 1, 2, . . . , N, the output symbols of the RSC encoder 108 are directed to the transmission antenna corresponding to the respective input symbols. That is, the output symbol of the RSC encoder 108 obtained by inputting the symbol $C^i$ is transmitted through the 20 transmission antenna i. If a binary RSC code with a code ratio of q/p is used as the inner code at the transmitter and is transmitted through the N transmission antennas, the output of the RSC encoder becomes p bits with respect to q input bits. Suppose that the size of the constellation for the modulation at the transmitter side is $2^p$ and the P/S converting procedure takes places in unit of q bits. The signal to be transmitted through each transmit antenna is selected among the $2^p$ constellation points in accordance with the value of the p bits. If the P/S converting procedure is performed in unit of nq bits, the size of the constellation for the modulation becomes $2^{np}$ at the transmitter.

Figure 2:
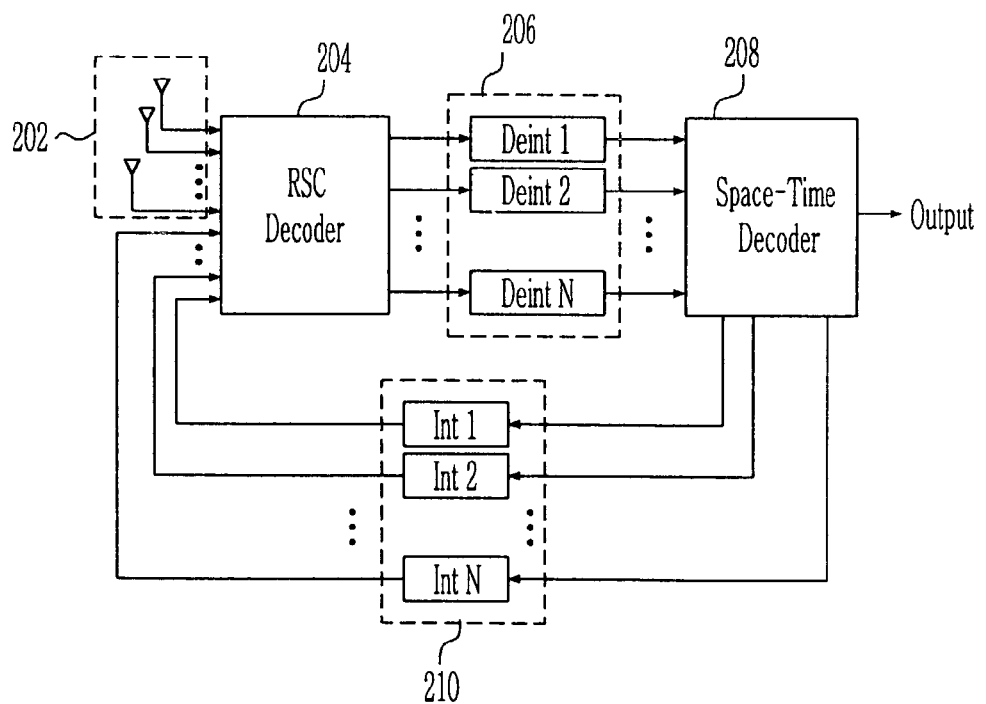
FIG. 2 is a block diagram illustrating the decoding method of a receiver having multiple antennas according to the embodiment of the present invention.

FIG. 2 is a block diagram illustrating the decoding method of the receiver having multiple antennas according to the embodiment of the present invention, and the receiver of the wireless communication system comprises receiving antennas 202, a RSC decoder 204, deinterleavers 206, a space-time decoder 208, and interleavers 210.

The data transmitted from the transmitter are received through M receiving antennas of the receiver side. All the signals received by the receiving antennas are added. The decoder in the receiver is divided into two component units each having soft-input and soft-output (SISO), and the RSC decoder 204 is a SISO I unit for decoding the inner code and the space-time decoder 208 is a SISO II unit for decoding the outer code.

The input of the RSC decoder 204 which is the SISO I is composed of two signals, and one is the signal received through the receiving antennas 202 and the other is the a priori probability distribution for the input symbols of the inner code which is outputted from the space-time decoder 208 which is the SISO II. RSC decoder 204 computes the a posteriori probability distribution for the input symbols of the inner code by using the input information, and extracts and outputs the extrinsic information from the computed probability distribution. In the first iteration, only the information inputted from the receiving antennas 202 is used, but the probability information for the input symbols of the RSC code outputted from the space-time decoder 208 is used after the first iteration. The a posteriori probability distribution may be computed by applying, for example, BCJR algorithm thereto.

The output signal of the RSC decoder 204 is deinterleaved in the deinterleavers 206 composed of Deint1, Deint2, . . . , DeintN and then is inputted to the space-time decoder 208 which is the SISO II.

The space-time decoder 208 computes the probability distribution for the input symbols of the RSC code and extracts and outputs the extrinsic informations therefrom. That is, the space-time decoder 208 computes the the a posteriori probability distribution for the output of the outer code and extracts and outputs the extrinsic information by using the extrinsic informations outputted from the deinterleavers 206, which becomes the a priori probability distribution of the input symbols of the inner code.

The extrinsic informations outputted from the space-time decoder 208 are interleaved in the interleaver 210 composed of Int1, Int2, . . . , IntN and the interleaved extrinsic informations are inputted to the RSC decoder 204 and becomes the a priori probability distribution in the RSC decoder 203 as mentioned above. After these procedures are iterated several times, the probability distribution for the input bits (information bits) of the outer code is computed and the values of the information bits are determined therefrom.

The decoding procedure in the receiver will be explained as an example. Each modulation signal representing np bits is transmitted from each transmit antenna and the RSC decoder decodes the N code symbols simultaneously transmitted through N transmit antennas by using a single decoder. To this purpose, the trellis diagram of the inner RSC code is converted into a trellis diagram having N×np bits as an output symbol for each state transition. This is done by folding Nn consecutive trellis sections onto one trellis section. Originally, the trellis has $2^q$ trellis branches per state, and the new trellis generated by this shortening procedure has $2^{Nnq}$ trellis branches per state. However, the total number of trellis states is not changed. Therefore, the total number of the trellis branches that must be computed in order to perform the decoding of Nnq bits in one iteration becomes (the state number in one RSC code)×$2^{Nnq}$. By this, the decoder has a lower complexity and has at least comparable performance as compared with the complex joint decoder.

The branch measures required for the decoding are computed as follows. Suppose that N symbols, which are the input of the RSC encoder in the transmission period k, are $d^k=(d_1^k, \ldots, d_N^k)$, the state of the RSC encoder is changed from $s^{k-1}$ to $s^k$ by this input, and N output symbols of the RSC encoder are $c^k=(c_1^k, \ldots, c_N^k)$. When the signals received by M receiving antennas are $(r_1^k, \ldots, r_M^k)$, the branch measures can be computed using the following equation (1):

$$\gamma_k(s^{k-1}, s^k) = P(r_1^k, \ldots, r_M^k | c_1^k, \ldots, c_N^k)$$

$$P(d_1^k) P(d_2^k) \ldots P(d_N^k) \quad (1)$$

for $i=1, 2, \ldots, N$, $$P(d_i^k | s_i^{k-1}, s_i^k) = 1$$

$P(r_1^k, \ldots, r_M^k | c_1^k, \ldots, c_N^k)$ can be obtained from the output of the demodulator by using the channel model showing the relationship between the transmitted and received signals. In the first iteration, $P(d_i^k)$ is given a uniform distribution and after the first iteration, it is updated by using the extrinsic informations received from the space-time decoder.

Hereinafter, in the case of two transmit antennas and one receive antenna, the decoding procedure according to the embodiment of the present invention will be explained. Suppose that each transmit antenna transmits QPSK modulated signals, the outer space-time code receives two bits as an input symbol and outputs two two-bit output symbols, and the inner RSC code is a binary RSC code with a code rate of ½.

First, in the RSC decoder, the branch measure and the LLR (Log Likelihood Ratio) are computed. The decoding procedure basically follows the Log-MAP decoding method, in which the MAP decoding algorithm is performed in the log domain (Robertson et al, "A comparison of optimal and sub-optimal MAP decoding algorithms operating in the log domain", Proc, IEEE ICC, pp. 1009–1013, Seattle, Wash., June, 1995).

The branch measures required for the MAP decoding are computed by using equation (2)

$$\gamma_k(S^{k-1}, S^k) = p(S^{k-1}, r | S^k) \quad (2)$$

$$= p(S^{k-1} | S^k) p(d^k | S^{k-1}, S^k) p(r^k | d^k, S^{k-1}, S^k)$$

$$= p(d_1^k, d_2^k) p(r^k | c_1^k, c_2^k), \text{ when } p(d^k | S^{k-1}, S^k) = 1,$$

In the equation (2), since the two successive input symbols of the RSC encoder are independent, $p(d_1^k, d_2^k) = p(d_1^k) p(d_2^k)$ and $p(r^k | c_1^k, c_2^k)$ is given below as equation (3).

$$p(r_1 | c_1, c_2) = \frac{1}{\sqrt{\alpha N_0}} \exp\left[ = \frac{\left| r_1 - \sum_{i=1}^{2} a_{i,1} c_i \right|^2}{N_0} \right] \quad (3)$$

Thus, $$\ln \gamma_k(S^l, S) = -\frac{1}{N_0} \left[ r_1 - \sum_{i=1}^{2} a_{i,1} c_i \right]^2 + \ln p(d_1, d_2) + K \quad (4)$$

The RSC decoder computes the first term in the equation (4) by using the signals received from the receive antennas. The second term in the equation (4) can be computed as follows. Given the a priori LLR value for the two successive input bits of the RSC encoder, $\ln p(d_1)$ is calculated using the following equation (5)

$$\ln P(d_1=1) = LLR1^{input} - \ln(1 + e^{LLR1^{input}}),$$

$$\ln P(d_1=0) = -\ln(1 + e^{LLR1^{input}}), \quad (5)$$

Here, $LLR1^{input}$ is the a priori LLR value for the $d_1$ bit. Also, the $\ln p(d_2)$ can be obtained in a similar way. In the Log-MAP algorithm suggested by Robertson et al., the following quantities are defined in the log-domain.

$$\bar{\gamma}_k(S', S) \equiv \ln \bar{\gamma}_k(S', S), \bar{\alpha}_k(S_k) \equiv \ln \alpha_k(S_k), \bar{\beta}_k(S_k) \equiv \ln \beta_k(S_k)$$

By applying the Max-Log-MAP algorithm, the following equations are obtained.

$$\bar{\alpha}_k(S_k) \approx \max_{(S_{k-1}, i)} (\bar{\gamma}_i((y_k^s, y_k^p), S_{k-1}, S_k) + \bar{\alpha}_{k-1}(S_{k-1})) - \quad (6)$$

$$\max_{(S_k, S_{k-1}, i)} (\gamma_i((y_k^\pi, y_k^p), S_{k-1}, S_k) + \bar{\alpha}_{k-1}(S_{k-1}))$$

$$\bar{\beta}_k(S_k) \approx \max_{(S_{k+1}, i)} (\bar{\gamma}_i((y_{k+1}^\pi, y_{k+1}^p), S_k, S_{k+1}) + \bar{\beta}_{k+1}(S_{k+1})) -$$

$$\max_{(S_k, S_{k+1}, i)} (\gamma_i((y_{k+1}^\pi, y_{k+1}^p), S_k, S_{k+1}) + \bar{\alpha}_k(S_k))$$

Then, the posteriori LLR for the input bit $d_k$ is given by the equation (7).

$$L(d_k) \approx \max_{(S_k, S_{k-1})} (\bar{\gamma}_i((y_k^s, y_k^p), S_{k-1}, S_k) + \bar{\alpha}_{k-1}(S_{k-1}) + \bar{\beta}_k(S_k)) - \quad (7)$$

$$\max_{(S_k, S_{k-1})} (\bar{\gamma}_0((y_k^\pi, y_k^p), S_{k-1}, S_k) + \bar{\alpha}_{k-1}(S_{k-1}) + \bar{\beta}_k(S_k))$$

In the present invention, the posteriori LLR is computed by applying the equation (7) to two successive input bits to the RSC encoder as follows. When the input bit is ij, xij is defined as equation (8).

$$xij = \max_{S_{k-1}, S_k} \{\bar{\gamma}_i((y_k^x, y_k^p), S_{k-1}, S_k) + \bar{\alpha}_{k-1}(S_{k-1}) + \bar{\beta}(S_k)\} \quad (8)$$

Applying Max-Log-MAP algorithm, the LLR corresponding to the extrinsic information can be computed as equation (9).

$$LLR1 = \max(x10, x11) - \max(x00, x01) - LLR1^{input}$$

$$LLR2 = \max(x01, x11) - \max(x00, x10) - LLR2^{input} \quad (9)$$

In the equation (9), the LLR1 and LLR2 are extrinsic informations for $d_1$ and $d_2$ bits, respectively. The max(x, y) can be replaced by accurate values by introducing a correcting function.

Next, the branch measure and the bit unit LLR are computed in the outer space-time decoder. The LLR1's and LLR2's computed in the equation (9) are deinterleaved and then are inputted to the space-time decoder as the extrinsic informations to be used in the decoding procedure. The deinterleaved LLR1's and LLR2's provide the a priori probability distributions for the output symbols of the space-time encoder.

When the output symbols of the space-time trellis branch are two-bit symbols $C_1$ and $C_2$, the two-bit symbols can be expressed as $C_1 = C_{12}C_{11}$, $C_2 = C_{22}C_{21}$, where $C_{12}$, $C_{11}$, $C_{22}$, $C_{21} \in \{0, 1\}$. For the decoding, the extrinsic informations LLR1's and LLR2's are divided into the odd-th term and the even-th term as the equations (10) and (11), and are considered to give the a priori probabilities for the output symbols of the space-time encoder. That is, $LLR^{input}(C_{11})$ and $LLR^{input}(C_{12})$ are given by the even-th term as equation (10)

$$LLR^{input}(C_{11}) = LLR1$$

$$LLR^{input}(C_{12}) = LLR2 \quad (10)$$

$LLR^{input}(C_{21})$ and $LLR^{input}(C_{22})$ are given by the odd-th term expressed as equation (11).

$$LLR^{input}(C_{21}) = LLR1$$

$$LLR^{input}(C_{22}) = LLR2 \quad (11)$$

The branch measure in the space-time trellis diagram is computed as follows. When the output symbols of the space-time trellis branch are $C_1$ and $C_2$, $$\ln \bar{\gamma}(S', S) = \ln P(C_1 = c_1) + \ln P(C_2 = c_2) \quad (12)$$

Here, the probability of the code symbol is expressed as the product of the probabilities of the constituent bits.

$$\ln P(C_1 = c_1) = \ln P(C_{11} = c_{11}) + \ln P(C_{12} = c_{12}) \quad (13)$$

In the equation (13), $C_1 = C_{12}C_{11}$ and $C_{12}$, $C_{11}$, $\in \{0, 1\}$, and $\ln P(C_{11} = c_{11})$ and $\ln P(C_{12} = c_{12})$ can be computed by using the extrinsic information, as the below equation (14).

$$\ln P(C_{11} = 1) = LLR^{input}(C_{11}) - \ln(1 + e^{LLR^{input}(C_{11})})$$

$$\ln P(C_{11} = 0) = -\ln(1 + e^{LLR^{input}(C_{11})}) \quad (14)$$

The branch measure is then computed by using equations (14) and (15).

$$\bar{\gamma}(S', S) = \ln P(C_{11} = c_{11}) + \ln P(C_{12} = c_{12}) + \ln P(C_{21} = c_{21}) + \ln P(C_{22} = c_{22}) \quad (15)$$

But, since the common term $\ln(1 + e^{LLRinput})$ is unrelated to the state transition and does not influence the LLR computation for the output bit of the encoder, it can be ignored.

The output of the space-time decoder is the updated LLR for the output bits of the space-time encoder. Applying the Max-Log-MAP algorithm, the LLR can be obtained as follows. For the output bit ij of the space-time encoder, cij is defined as the equation (16).

$$cij = \bar{\gamma}_1((y_k^x, y_k^p), S_{k-1}, S_k) + \bar{\alpha}_{k-1}(S_{k-1}) + \bar{\beta}(S_k) \quad (16)$$

Also ci_j's are defined as follows, c1__0 = max (c00, c01, c02, c03)
c1__1 = max (c10, c11, c12, c13)
c1__2 = max (c20, c21, c22, c23)
c1__3 = max (c30, c31, c32, c33)
c2__0 = max (c00, c10, c20, c30)
c2__1 = max (c01, c11, c21, c31)
c2__2 = max (c02, c12, c22, c32)
c2__3 = max (c03, c13, c23, c33)

Then, the LLR for the output bits of the space-time encoder (the input bits of the RSC encoder) is expressed as the equation (17).

$$LLR(C11) = \max(c1\_1, c1\_3) - \max(c1\_2, c1\_0) - LLRinput(C11)$$

$$LLR(C12) = \max(c1\_2, c1\_3) - \max(c1\_1, c1\_0) - LLRinput(C12)$$

$$LLR(C21) = \max(c2\_1, c2\_3) - \max(c2\_2, c2\_0) - LLRinput(C21)$$

$$LLR(C22) = \max(c2\_2, c2\_3) - \max(c2\_1, c2\_0) - LLRinput(C22) \quad (17)$$

After the extrinsic information is interleaved, it is provided to the RSC decoder as the a priori LLR for the input bit of the RSC encoder.

In order to obtain the LLR for the information bit, the following quantities are defined as follows, a0 = max(c00, c20, c01, c21, c02, c22, c03, c23)
a1 = max(c10, c30, c11, c31, c12, c32, c13, c33)
b0 = max(c00, c10, c01, c11, c02, c12, c03, c13)
b1 = max(c20, c30, c21, c31, c22, c32, c23, c33)

Then, the LLR for the information bit ba can be obtained as the equation (18).

$$LLR(a) = a1 - a0$$

$$LLR(b) = b1 - b0 \quad (18)$$

Hereinafter, referring to FIG. 3, the simulation results of a frame error rate (FER) versus received $E_b/N_o$ according to the embodiment of the present invention will be explained.

Figure 3:
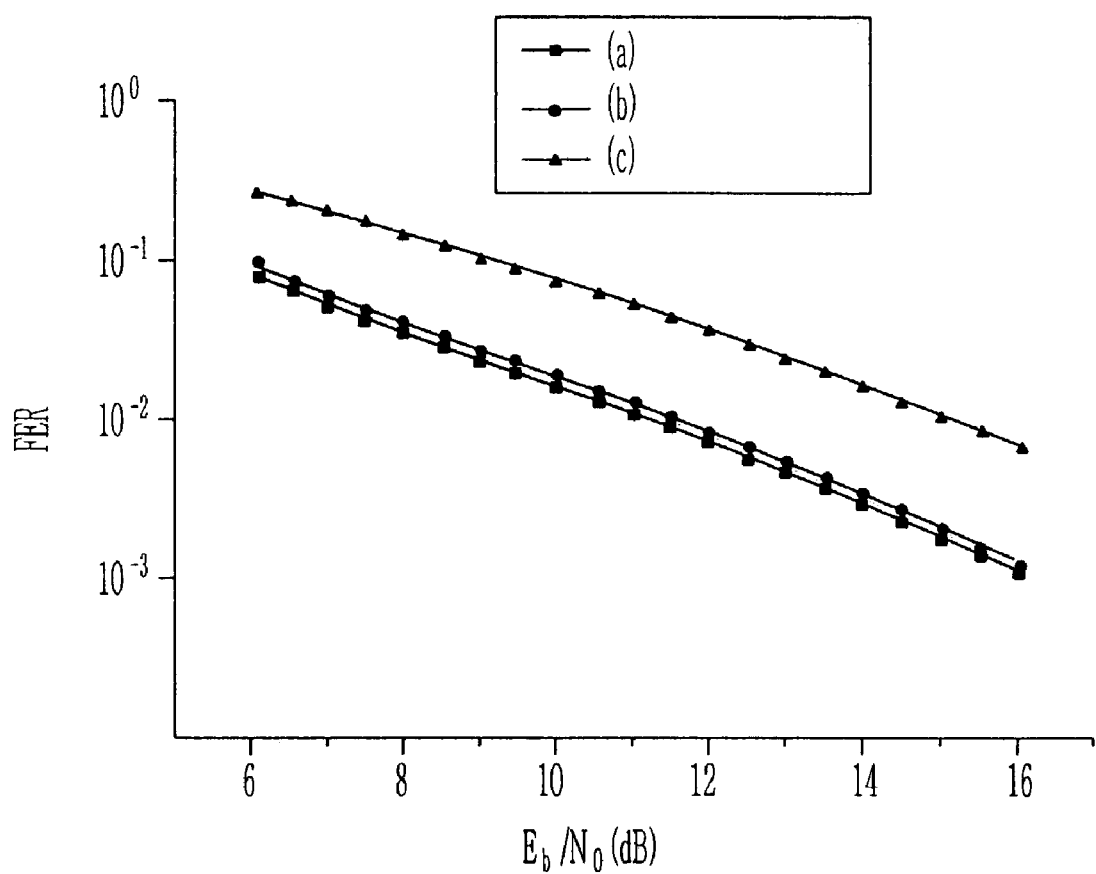
FIG. 3 is a graph showing the simulation results of a frame error rate versus received $E_b/N_o$ for the three encoding/decoding methods.

The line (a) in FIG. 3 is the simulation result of the FER versus received $E_b/N_o$ for the single-encoding/decoding method according to the present invention, the line (b) is the simulation result of the FER versus received $E_b/N_o$ for the multiple-encoding/joint-decoding method, the line (c) is the simulation result of the FER versus received $E_b/N_o$ for the multiple-encoding/individual-decoding method. The simulation uses two transmit antennas and one receive antenna, and is the result of the case that the outer code is the space-time trellis code having four trellis states suggested by Tarokh, the inner code is the binary RSC code with a code rate of ½, the number of the trellis states is four, the constraint length is 3, and the generating polynomial is expressed (5,3) in octal, the number of the information bits per frame is 240, and the iteration number in the decoding is 15, in the quasi-static, frequency-flat, and Rayleigh fading environment. As shown in FIG. 3, it is noted that the line (a), which is for the single-encoding/decoding method according to the present invention, shows the lowest FER. The multiple-encoding/joint-decoding method, in which the equal number of RSC codes as that of the transmit antennas are used as the inner code and the combined decoding is employed, corresponding to the line (b) in FIG. 3 has the highest complexity, but has slightly higher FER's than the line (a) for the single-encoding/decoding method. On the other hand, the line (c) for the individual-decoding method with the lowest complexity shows that its performance is much poor compared with the other methods.

As mentioned above, according to the present invention, since the signals are encoded by using a single RSC encoder in the encoding procedure and the output thereof is transmitted through the multiple transmit antennas and a plurality of signals transmitted simultaneously through a plurality of the transmit antennas are simultaneously decoded by using a RSC decoder in the decoding procedure, the complexity of the decoding procedure is remarkably reduced, maintaining a comparable or better performance compared with the complex joint decoding method, thereby the problems in the hardware implementation can be reduced.

Although the present invention has been illustrated and described with respect to exemplary embodiments thereof, the present invention should not be understood as limited to the specific embodiment, and it should be understood by those skilled in the art that the foregoing and various other changes, omission and additions may be made therein and thereto, with departing from the spirit and scope of the present invention.

What is claimed is:

1. A multiple-antenna wireless communication transmitting system having a plurality of transmitting antennas, comprising:
    a space-time encoder for receiving information bits and outputting a plurality of the code symbols per input symbol;
    interleavers for interleaving the plurality of the code symbols outputted from said space-time encoder;
    a parallel to serial (P/S) converter for converting the plurality of the parallel symbols outputted from said interleavers into serial symbols;
    a recursive systematic convolutional (RSC) encoder for encoding the serial symbols outputted from said P/S converter and outputting the code symbols, wherein the RSC encoder maps the serial symbols to a specific transmitting antenna of the plurality of antennas;
    a serial to parallel (S/P) converter for converting the serial code symbols outputted from said RSC encoder into a plurality of the parallel symbols; and
    a modulator for modulating the plurality of the parallel symbols outputted from said S/P converter and outputting the modulated signals to a plurality of the transmit antennas, each transmitting antenna corresponding to the respective modulated signal.

2. The multiple-antenna wireless communication transmitting system according to claim 1, wherein said interleavers are composed of a first interleaver, a second interleaver, . . . , and an N-th interleaver, and interleave the plurality of the code symbols outputted from said space-time encoder.

3. The multiple-antenna wireless communication transmitting system according to claim 2, wherein the outputs of the first interleaver, the second interleaver, . . . , the N-th interleaver become a first output, a second output, . . . , an N-th output, respectively, of said S/P converter after passing through said P/S converter, said RSC encoder, and said S/P converter, respectively.

4. A channel encoding method performed in a multiple-antenna wireless communication transmitting system, comprising the steps of:
    space-time encoding input information bits; interleaving a plurality of the space-time encoded symbols;
    converting said interleaved parallel symbols into serial symbols;
    recursive systematic convolutional (RSC) encoding said serial symbols to RSC encoded symbols, wherein said serial symbols are mapped to a specific transmitting antenna of the multiple-antennas;
    converting said RSC encoded symbols into a plurality of the parallel symbols; and
    after the plurality of the parallel symbols are modulated, transmitting the modulated signals through a plurality of the transmitting antennas each transmitting antenna corresponding to the respective modulated signal.

5. A channel encoding and decoding method performed in a multiple-antenna wireless communication system, comprising the steps of
    (a) space-time encoding input information bits;
    (b) interleaving a plurality of the space-time encoded symbols;
    (c) converting said interleaved parallel symbols into serial symbols;
    (d) recursive systematic convolutional (RSC) encoding said serial symbols to RSC encoded symbols, wherein said serial symbols are mapped to a specific transmitting antenna of the multiple-antennas;
    (e) converting said RSC code symbols into a plurality of the parallel symbols;
    (f) after the plurality of the parallel symbols are modulated, transmitting the modulated signals through a plurality of the transmitting antennas each transmitting antenna corresponding to the respective modulated signal;
    (g) RSC decoding to compute the a posteriori probability distribution for the input symbols of the RSC code by using signals received through a plurality of the receiving antennas;
    (h) deinterleaving the RSC decoded extrinsic informations;
    (i) performing space-time decoding by computing the a posteriori probability distribution for the output symbols of the space-time code by using the deinterleaved extrinsic informations as an a priori probability distribution for the output symbols of the space-time code;
    (j) interleaving the space-time decoded extrinsic informations;
    (k) RSC decoding to compute the a posteriori probability distribution for the input symbols of the RSC code by using said interleaved symbols as the a priori probability for the input symbols of the RSC code and by using the signals received through said plurality of the receiving antennas;
    (l) performing steps of (h) to (i), and
    (m) determining the values of the information bits by computing the probability distribution for input symbols of the space-time code.

6. The method as claimed in claim 5, wherein the step (g), RSC decoding signals simultaneously received through the plurality of the receiving antennas by converting the trellis diagram of the inner code into a trellis diagram having number of transmitting antennas (N)× transmitted code bits per antenna(np) bits as an output symbol.

7. The method as claimed in claim 5, further including the steps of iterating the steps of (j), (k) and (l) by predetermined number after said step (l).

* * * * *